Figure 1:
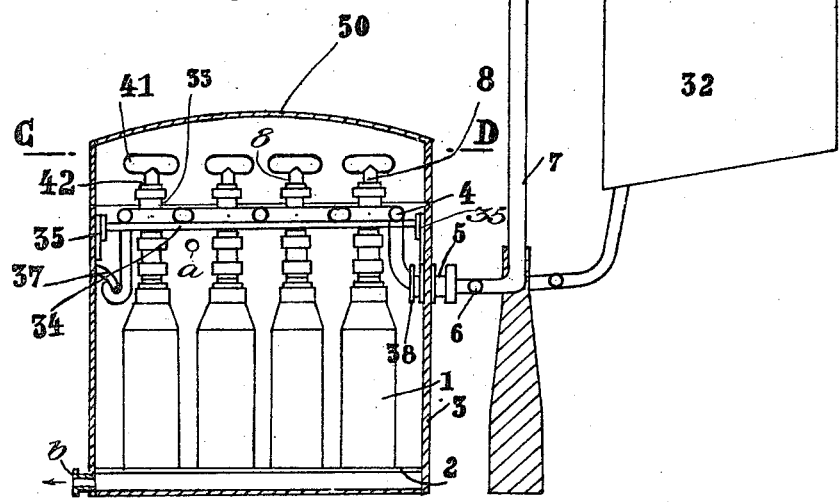

C. DE BOCK.
STERILIZING APPARATUS.
APPLICATION FILED MAR. 7, 1911.

1,052,210.

Patented Feb. 4, 1913.

3 SHEETS—SHEET 1.

Witnesses:
B. Dommers
Elizabeth Leckert

Inventor
Charles de Bock

C. DE BOCK.
STERILIZING APPARATUS.
APPLICATION FILED MAR. 7, 1911.

1,052,210.

Patented Feb. 4, 1913.

3 SHEETS—SHEET 2.

Witnesses
B. V. Sommers
Elizabeth Leckert

Inventor,
Charles de Bock,
By Hussey Orth Jr.
Atty.

C. DE BOCK.
STERILIZING APPARATUS.
APPLICATION FILED MAR. 7, 1911.

1,052,210.

Patented Feb. 4, 1913.
3 SHEETS—SHEET 3.

Witnesses
R. W. Sommers
Elizabeth Leckert

Inventor
Charles de Bock
By [signature]
Atty.

UNITED STATES PATENT OFFICE.

CHARLES DE BOCK, OF ZELE, BELGIUM.

STERILIZING APPARATUS.

1,052,210. Specification of Letters Patent. Patented Feb. 4, 1913.

Application filed March 7, 1911. Serial No. 612,940.

*To all whom it may concern:*

Be it known that I, CHARLES DE BOCK, a subject of the Kingdom of Belgium, residing in Zele, Belgium, have invented certain new and useful Improvements in Sterilizing Apparatus; and I do hereby declare the following to be a full, clear, and exact description of the invention, such as will enable others skilled in the art to which it appertains to make and use the same, reference being had the accompanying drawings, and to letters or figures of reference marked thereon, which form a part of this specification.
The present invention relates to the sterilization of milk and other liquids under pressure in their receptacles and transporting or dispensing vessels without altering the constituents thereof by the sterilizing operation. In order to accomplish this result, the receptacles or vessels and their contents must be heated to sterilizing temperature, that is, to a temperature sufficient to destroy the micro-organisms and their spores. This temperature, according to Pasteur, is for milk about 110° to 115° centigrade.

According to my invention I submit the material to be sterilized, in its vessel, from the beginning to the end of the sterilization and during the subsequent cooling, to pressure in excess of the vapor pressure of the liquid at the sterilization temperature, so that there cannot occur, during sterilization, any decomposition or change in the liquid by reason of the high temperature used. For the sterilization of milk the pressure employed is from two to four atmospheres.
It has been proposed to sterilize in closed vessels, but pressure has not been applied to their contents before the heating of them has commenced, consequently the pressure inside these vessels only gradually rises as the heating progresses. Such pressure is produced solely by the pressure of the vapor produced inside the vessel by reason of the heat applied to its outside. The consequence is that there is not sufficient pressure on the contents of the vessels at the beginning and end of the heating operation to prevent decomposition of said contents.

A mechanism for sterilizing in the manner above described by me, and especially constructed for the sterilization of milk is shown in the accompanying drawings, in which like parts are similarly designated.

Figure 2:
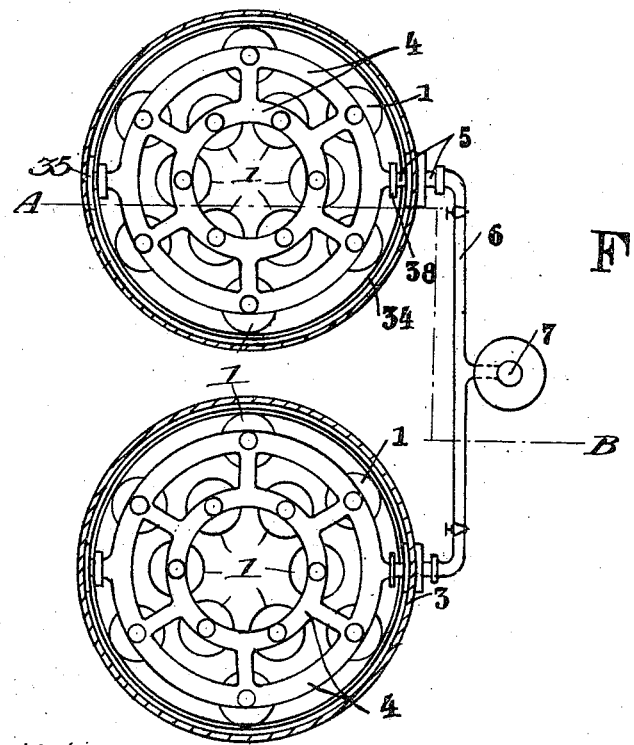
Figure 3:
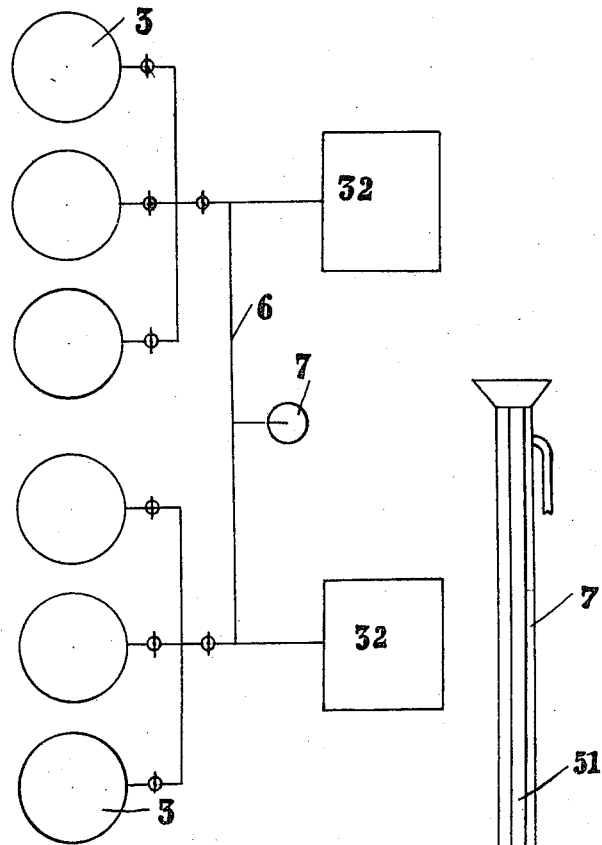
Figure 7:
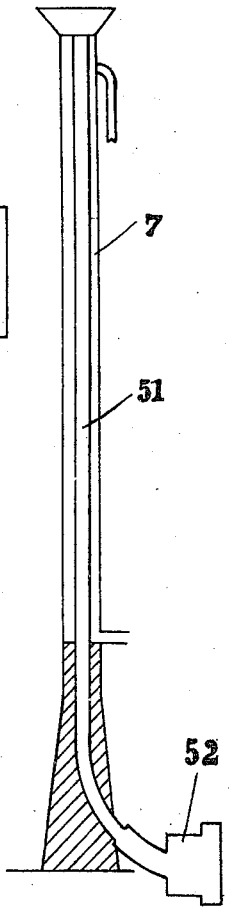
Figure 4:
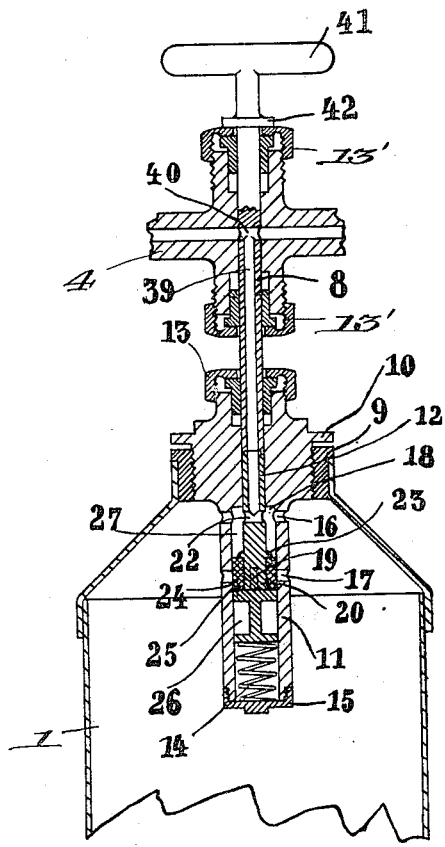
Figure 5:
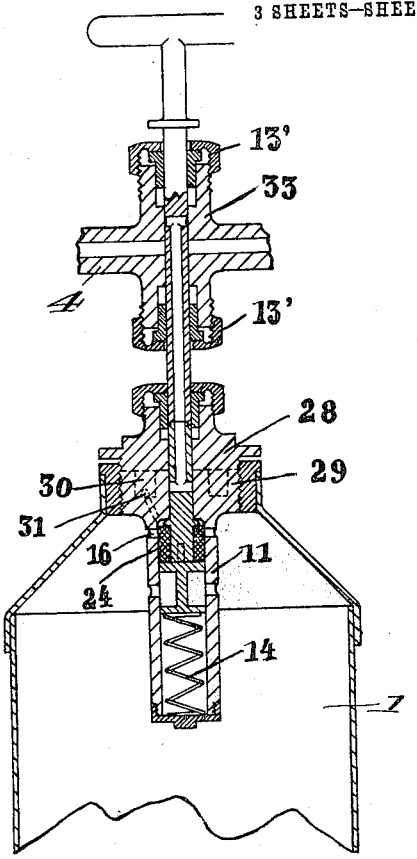
Figure 6:
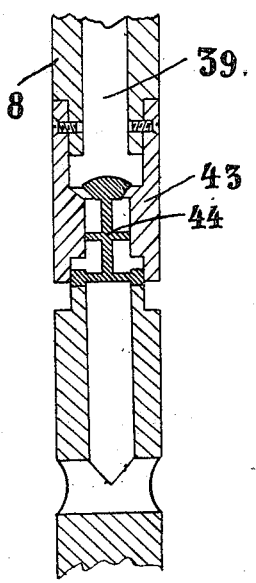

Figure 1 is a view of the apparatus, partly in vertical section, taken on the line A—B, Fig. 2; Fig. 2 is a horizontal section on the line C—D Fig. 1; Fig. 3 is a diagrammatic view of a plant containing a number of sterilizing receptacles common to a single supply means; Fig. 4 is a section of part of one of the vessels and its valve mechanism in open position; Fig. 5 is a similar view of a modification of Fig. 5 in closed position; Fig. 6 is a section of a modified form of supply valve; Fig. 7 is a modified form of valve controlling the supply of liquid to the receptacles.

In the drawings I have illustrated a number of dispensing vessels, as milk bottles or cans, 1, intended to be delivered sealed, with their contents to the consumers. These bottles are placed on an open-work false bottom 2, secured within and slightly above the bottom of the sterilizing vessel or autoclave 3. This vessel is provided with an inlet opening *a* for the sterilizing steam or hot water, and an outlet *b* for the same. The cooling water is admitted and discharged through the same openings.

Above the bottom of the vessel and dispensing receptacles 1 is a support or rod 34 secured at 35 to the walls of the autoclave. Supported by 34 is distributing piping 4 for distributing the milk to the receptacles 1. This piping 4 is connected to a supply pipe 5 by means of a detachable or nut joint 38. The pipe 5 is connected to a branch pipe 6 supplied from a pressure pipe 7 of suitable height. The piping 4 is also retained in place by a fork 37 on the wall of the autoclave. On the piping 4 and provided cocks 8, one for each milk vessel, that control the supply of milk to the interior of the bottles. These cocks operate in enlargements 33 of the piping 4.

Each receptacle or bottle 1 carries at its neck an interiorly threaded ring 9 soldered or otherwise secured in the neck. Screwing into this ring 9 is a closure or tap 10 having a tubular prolongation 11 extending into the receptacle. The tap 10 is provided with a bore 12 into the upper end of which the discharge pipe 8 of a cock extends, and preferably through a stuffing box 13, which may or may not be removable. The tubular extension 11 is closed by a plug or cap 15, and is provided with two sets of ports 16 and 17 at different levels. Within the extension is a piston normally urged upward by a spring 14 between the cap 15 and lower end of the piston. The piston comprises a removable shank having a tubular upper portion 12, open at the upper end and terminating at the lower portion in ports 22. Below the ports the shank is provided with a flange 23 convex on its upper surface. Below the flange 23 the shank has a circularly grooved portion 20 and a threaded bore in its lower end into which is screwed the screw 19 of the portion 25 of the piston. The bore in the upper portion of the shank 20 registers with the bore 39 in a cock 8. The upper end of the bore 39 terminates in a transverse bore 40 arranged to be placed in communication with the piping 4 when the cock is in lowered position. The upper end of the cock above the bore 40 is solid and is provided with a stop flange 42 arranged to take against the upper stuffing box 13' and with a handle 41.

The milk bottles or receptacles 1 are arranged in the autoclave 3 as shown in Fig. 1, the cocks 8 are opened as well as those in pipes 6, and milk under pressure is admitted from the stand-pipe 7, elevated tank 32 or otherwise, to the piping 4, through the cocks 8, bore 12, ports 22, tubular extension 11 and ports 16 therein to the bottles or receptacles, 1. When the receptacles 1 have been filled, sterilizing steam or hot water is admitted to the autoclave through $a$ and the receptacles 1 are heated thereby while under the internal pressure of the milk. After the sterilization the hot water or steam is drawn off from 3 and the receptacles 1 are cooled, either by cold water admitted through $a$ or by opening the autoclave to admit outside air. After cooling the cocks are closed and the piping 4 with the cocks 8 therein is lifted off the set of receptacles 1. In so doing each piston is raised, urged upward by its spring 14.

The ports 24 communicate with the annular chamber 26, admitting thereto a quantity of milk from two to four times the volume of the annular space 27 above the piston, thereby reducing the pressure above the piston, draining the shank 12 and space 27 as the piston ascends to its upper limit when ports 16 are closed by the packing, as shown in Fig. 5.

In order to prevent the loss of milk contained in the cocks 8 it is preferable to provide these cocks with a check valve 44 at their exits, as shown in Fig. 6, and each valve is contained in a short tubular portion 43 secured to the cocks 8 as shown.

In Fig. 5 I have shown the cover of the receptacles made in two parts, 28 and 29. In the lower portion 29 is a chamber 30 connected to the space above the piston by a duct 31.

The tubes 5—7 are of suitable height and are intended to produce a suitable lactostatic pressure to allow the sterilization to be produced at the required temperature without dissociating the milk components.

The filling of the receptacles 1 may be effected from the stand pipe 7, from elevated tank 32, or from a suction and force pump. The receptacles 1 may also be filled before placing them in the autoclave 3, if desired. In all of the cases it will be understood that the filling will be completed by means of a pump unless the stand-pipe 7 is sufficiently filled with milk to produce the necessary pressure.

In Fig. 7 I have shown a pump 52 whose discharge pipe 51 supports the stand-pipe 7.

In Fig. 3 I have shown diagrammatically the autoclaves 3 in sets, each set supplied by an elevated tank 32 and a stand-pipe common to the sets, there being suitable valves in the pipe connections whereby an individual autoclave and its contents, or a set thereof may be cut off from the milk supply. The receptacle 32 may be connected to a suction and force pump if desired, to accomplish the filling under pressure.

I claim—

1. In apparatus for sterilizing under pressure the combination with a sterilizing vessel, a piping in said vessel, transporting receptacles in said vessel, filling means for said receptacles and arranged to be hermetically sealed thereto, means to produce at said filling means a predetermined pressure of the liquid to be sterilized by maintaining a hydrostatic column of said liquid connected to said filling means and devices to open and close communication at will between said column and filling means.

2. In an apparatus for sterilizing under pressure, the combination of an autoclave, a piping in said autoclave and means for maintaining a determined pressure of the substance to be sterilized in said piping; of transporting receptacles in said autoclave and means for connecting said piping with said receptacles.

3. In an apparatus for sterilizing under pressure, the combination of an autoclave, a piping within said autoclave and means for maintaining a determined pressure in said piping; of transporting receptacles in said autoclave, cocks having longitudinal borings and crossing said piping, spring-operated pistons to close the transporting receptacles, said pistons arranged to be lowered by said cocks when connected to the piping by the cocks.

4. In an apparatus for sterilizing under pressure, the combination of an autoclave, a piping in the autoclave, means for keeping a determined pressure in said piping, and transporting receptacles in the autoclave; of cocks having longitudinal borings crossing said piping, spring-operated pistons to hermetically close the transporting receptacles, said pistons arranged so as to be lowered by the cocks, and recesses formed in the transporting vessels and connected with said receptacles when said pistons are near the end of their closing stroke.

In testimony that I claim the foregoing as my invention, I have signed my name in presence of two subscribing witnesses.

CHARLES de BOCK.

Witnesses:
   GEORGES VANDER HAEYHEN,
   PAUL EARLY.